(12) United States Patent
Luebbert

(10) Patent No.: US 9,702,967 B2
(45) Date of Patent: Jul. 11, 2017

(54) METHOD FOR SETTING A DETECTION THRESHOLD FOR A RECEIVED SIGNAL OF A FREQUENCY-MODULATED CONTINUOUS WAVE RADAR SENSOR OF A MOTOR VEHICLE ON THE BASIS OF THE NOISE LEVEL, RADAR SENSOR AND MOTOR VEHICLE

(71) Applicant: VALEO Schalter und Sensoren GmbH, Bietigheim-Bissingen (DE)

(72) Inventor: Urs Luebbert, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 176 days.

(21) Appl. No.: 14/652,545

(22) PCT Filed: Dec. 18, 2013

(86) PCT No.: PCT/EP2013/077040
§ 371 (c)(1),
(2) Date: Jun. 16, 2015

(87) PCT Pub. No.: WO2014/095965
PCT Pub. Date: Jun. 26, 2014

(65) Prior Publication Data
US 2015/0331098 A1    Nov. 19, 2015

(30) Foreign Application Priority Data
Dec. 19, 2012   (DE) .................. 10 2012 024 999

(51) Int. Cl.
*G01S 7/35*     (2006.01)
*G01S 13/34*    (2006.01)
(Continued)

(52) U.S. Cl.
CPC .............. *G01S 7/354* (2013.01); *G01S 13/34* (2013.01); *G01S 13/931* (2013.01); *G01S 2013/9332* (2013.01); *G01S 2013/9389* (2013.01)

(58) Field of Classification Search
CPC ... G01S 7/02; G01S 7/35; G01S 7/352; G01S 7/354; G01S 13/02; G01S 13/06;
(Continued)

(56) References Cited

U.S. PATENT DOCUMENTS 3,587,097 A * 6/1971 Stull, Jr. ............... G01S 13/585
                                                    324/76.19
3,701,149 A * 10/1972 Patton ................. G01S 13/5246
                                                    342/93

(Continued)

FOREIGN PATENT DOCUMENTS

DE   10 2009 057 191 A1   6/2011
EP        0 642 190 A1   3/1995

OTHER PUBLICATIONS

International Search Report issued in PCT/EP2013/077040 mailed on Mar. 21, 2014 (3 pages).

*Primary Examiner* — Bernarr Gregory
(74) *Attorney, Agent, or Firm* — Osha Liang LLP

(57) ABSTRACT

A method for setting a detection threshold for a received signal of a frequency-modulated continuous-wave radar sensor of a motor vehicle is disclosed. In successive measuring cycles of the radar sensor in each case a radar signal is emitted into a capture zone of the radar sensor and a received signal is received, in each measuring cycle a frequency spectrum relating to the respective received signal is determined, wherein individual frequency bins of the frequency spectrum each correspond to a signal level in a range-resolution cell, and the detection threshold is set individually in each case for a subset consisting of at least (Continued)

one frequency bin, and in order to set the detection threshold, a noise level is determined from frequency bins of temporally preceding measuring cycles and/or from frequency bins of adjacent Doppler-resolution cells of the frequency spectrum.

13 Claims, 5 Drawing Sheets

(51) Int. Cl.
*G01S 13/93* (2006.01)
*G01S 13/00* (2006.01)

(58) Field of Classification Search
CPC .......... G01S 13/08; G01S 13/32; G01S 13/34; G01S 13/88; G01S 13/93; G01S 13/931; G01S 2013/9332; G01S 2013/9371; G01S 2013/9389; G01S 7/28; G01S 7/285; G01S 7/292; G01S 7/2921; G01S 7/2922; G01S 13/50; G01S 13/52; G01S 13/522; G01S 13/524; G01S 13/5244; G01S 13/5246; G01S 13/58; G01S 13/585
See application file for complete search history.

(56) References Cited

U.S. PATENT DOCUMENTS

| | | | | |
|---|---|---|---|---|
| 4,044,352 | A * | 8/1977 | Wilmot | G01S 7/2922 342/159 |
| 4,536,764 | A * | 8/1985 | Freeman | G01S 13/5246 342/159 |
| 5,021,791 | A * | 6/1991 | Hurd | G01S 13/522 342/200 |
| 5,280,289 | A * | 1/1994 | Root | G01S 13/5244 342/91 |
| 5,499,030 | A * | 3/1996 | Wicks | G01S 7/292 342/159 |
| 5,508,706 | A | 4/1996 | Tsou et al. | |
| 5,633,642 | A | 5/1997 | Hoss et al. | |
| 5,929,802 | A | 7/1999 | Russell et al. | |
| 7,339,517 | B2 * | 3/2008 | Nakanishi | G01S 7/354 342/192 |
| 2011/0163909 | A1 | 7/2011 | Jeong | |

* cited by examiner

METHOD FOR SETTING A DETECTION THRESHOLD FOR A RECEIVED SIGNAL OF A FREQUENCY-MODULATED CONTINUOUS WAVE RADAR SENSOR OF A MOTOR VEHICLE ON THE BASIS OF THE NOISE LEVEL, RADAR SENSOR AND MOTOR VEHICLE

BACKGROUND

The invention relates to a method for setting a detection threshold with which a received signal of a frequency-modulated continuous-wave radar sensor of a motor vehicle is compared method with the aim of detecting a target object in the environment of the motor vehicle. In successive measuring cycles the radar sensor emits in each case a radar signal into a capture zone and receives a radar signal reflected within the capture zone as a received signal. In each measuring cycle a frequency spectrum relating to the respective received signal is determined, the individual frequency bins of which frequency spectrum correspond respectively to a signal level, in particular to the power of the received signal, in a range-resolution cell of the radar sensor. In each measuring cycle the detection threshold is set individually in each case for a subset consisting of at least one frequency bin, and in order to set the detection threshold for the respectively current subset of the frequency bins a noise level of the frequency spectrum is determined. The detection threshold is then set as a function of the noise level, for example by multiplication of the noise level by a predetermined factor. The invention relates, in addition, to a frequency-modulated continuous-wave radar sensor for a motor vehicle, and also to a motor vehicle with such a radar sensor.

Radar sensors for motor vehicles (automotive radar sensors) are already state of the art and are operated, for example, at a frequency of about 24 GHz or about 79 GHz. Radar sensors serve generally for the detection of target objects in the environment of the motor vehicle, and assist the driver in numerous respects in connection with the driving of the motor vehicle. In the present case, the focus is on, in particular, towards a blind-spot detection system (blind-spot warning), by means of which the driver is warned of the presence of target objects in the blind-spot zone of the motor vehicle.

Radar sensors measure, on the one hand, the spacing between the target object and the vehicle. They also measure, on the other hand, both the relative velocity with respect to the target object and also the so-called target angle, i.e. an angle between an imaginary connecting line leading to the target object and a reference line, for instance the longitudinal axis of the vehicle or a radar axis extending perpendicularly with respect to the front face of the sensor. With the aid of a radar sensor, the respectively current position of the target object relative to the vehicle can consequently be determined, and the target object can be tracked in the capture zone of the radar sensor, i.e. the relative position of the target object can be determined continuously over a plurality of measuring cycles of the radar sensor. Tracking is possible on the assumption that the points of reflection detected on the target object remain stable over the measuring cycles.

Radar sensors are usually placed behind the bumper, for example in the respective corner regions of the rear bumper. In order to detect the target object, the radar sensor emits a transmitted signal (electromagnetic waves) which is then reflected at the target object to be detected and is received as a radar echo by the radar sensor. In the present case, it is a question in particular of the so-called frequency-modulated continuous-wave radar sensor (FMCW radar), in which the emitted signal comprises a sequence (burst) of frequency-modulated chirp signals which are emitted one after the other. Correspondingly, the received signal of the radar sensor also comprises such a plurality of chirp signals which are processed and evaluated with regard to the aforementioned measured variables. In general, at least one chirp signal can be emitted. The received signal in this case is firstly downmixed into the baseband and subsequently converted, by means of an analogue-to-digital converter, into a digital received signal with a plurality of sampled values, and subjected to an FFT (fast Fourier transformation). The sampled values are then processed by means of an electronic computing device (digital signal processor) in the time domain and/or in the frequency domain.

With a radar sensor, a relatively wide azimuthal angular range, which may even amount to 150°, is typically captured in the horizontal direction. The radar sensor therefore exhibits a relatively large azimuthal capture angle, with the result that the field of view or the capture zone of the radar sensor in the azimuth direction is correspondingly wide. The azimuthal capture angle is, as a rule, symmetrical with respect to a radar axis extending perpendicularly with respect to the front face of the sensor, with the result that the azimuthal capture angle of, for example, −75° to +75° is measured with respect to the radar axis. This azimuthal capture zone can be subdivided into smaller subzones which are irradiated and captured, one after the other, by the radar sensor. For this purpose, the main lobe of the transmitting antenna is, for example, swivelled electronically in the azimuth direction, for example in accordance with the phase-array principle. The receiving antenna may in this case exhibit in the azimuth direction a receiving characteristic with which the entire azimuthal capture zone is covered. Such a radar sensor is known, for example, from document DE 10 2009 057 191 A1. A further radar sensor is known from document US 2011/0163909.

Accordingly, the blind-spot zone of a motor vehicle can also be monitored with the aid of a radar sensor, and the driver can be warned where appropriate. In the state of the art, the functionality of blind-spot monitoring is based on the stated tracking of a target: the radar sensor firstly detects the target object, for example another vehicle, and tracks this target object in the capture zone. If the target object enters—for example when overtaking—a predetermined warning zone that corresponds to the blind-spot zone, a warning signal is output in the motor vehicle. The driver is consequently informed of the presence of the target object in the blind-spot zone. In order to be able to track the target object over a plurality of measuring cycles of the radar sensor, it is necessary to obtain a sufficient number of rough detections relating to one and the same target object. This means that a point of reflection, detected in a particular measuring cycle, of the target object also has to be detected in a subsequent measuring cycle. Accordingly, stable tracking of the target object means, in other words, that the detections originate in each case from a point of reflection of the target object that remains stable in its range and angle between successive measuring cycles. Consequently, points of reflection which are detected in differing measuring cycles are assigned to one another.

The detection of points of reflection alone is typically effected in the frequency domain. For this purpose the received signal is subjected to a Fourier transformation, namely the FFT (fast Fourier transformation), and a frequency spectrum of the already downmixed received signal is determined. The points of reflection of target objects are represented by peaks in the received spectrum. In the course of the FFT, power values of the received signal are determined for a plurality of frequency values (and, more precisely, of small frequency intervals). These power values are also known by the designation 'FFT bin' or 'frequency bin'. The FFT accordingly provides a plurality of frequency bins which respectively represent a signal value for a particular frequency domain, or, a particular frequency value. Because in the case of an FMCW radar the frequency of the received signal also depends on the range of the target object, each frequency bin is respectively assigned to a range-resolution cell. The size of a range-resolution cell defines here the resolution of the radar sensor, with which the range of the target object can be determined.

The target echoes and the measuring noise are superimposed additively. The measuring noise is frequency-dependent and increases at higher frequencies. Also by virtue of so-called 'clutter'—that is to say, undesired reflections on the ground, vegetation and extensive infrastructure objects—additional interference signals are superimposed on the useful signal in a frequency-dependent manner. In order to enable the detection of a target echo in the received signal, the frequency bins—that is to say, the signal values—are compared with a detection threshold. The signal peaks or target echoes that are present in the received signal are detected with the aid of a threshold-value detector. If the level of the frequency bin currently being examined lies above the detection threshold, detection takes place in the assigned range-resolution cell. The detection threshold is set adaptively during the operation of the radar sensor, specifically, for example, in accordance with the CFAR method (constant false-alarm rate). According to this method, the detection threshold is adapted in such a manner that it always lies above the noise level by a predetermined factor. If no target object is present, the detector incorrectly detects a target whenever the noise signal or interference signal lies above the detection threshold. If the detection threshold is set relative to the interference power, a constant false-alarm rate results, i.e. a constant probability that the instantaneous interference signal exceeds the detection threshold.

The detection threshold is calculated individually for each frequency bin. For this purpose, the CA-CFAR method, for example, may be applied, in which for each frequency bin a noise level is used for setting the detection threshold, said noise level being averaged arithmetically from the adjacent frequency bins. Another method (OS-CFAR) is to employ the so-called rank-order filter, in which a fixed rank is selected as the noise level. A rank-order filter of such a type has been shown in a schematic representation in FIG. 1. The FFT algorithm provides the frequency bins R which are respectively assigned to a range-resolution cell $C_0$ to $C_{N-1}$. The cell under test CUT will be examined here. The frequency bin R of this cell CUT is supplied to a comparator 100 to which, on the other hand, the detection threshold T that is determined individually for the CUT is also supplied. In order to determine the detection threshold T, the rank-order filter 200 orders the frequency bins $R_0$ to $R_{N-1}$ by size. A predetermined rank, namely frequency bin $R_{rk}$, is then selected as the noise level for the CUT and is multiplied by a predetermined factor C. The result constitutes the current detection threshold T. Frequency bin $R_{rk}$ is accordingly used as the noise level that constitutes the basis for the establishment of the detection threshold T for the CUT. The frequency bins R from the range-resolution cells 300 immediately adjacent to the CUT are not taken into account in the determination of the noise level $R_{rk}$. These cells 300 constitute so-called 'guard cells'. This is because a target echo that is present in the CUT typically extends also to the immediately adjacent cells 300, so that these cells 300 are not to be used for determining the noise level.

The noise level $R_{rk}$ is therefore estimated in the state of the art by filtering the frequency bins over the range or over the range-resolution cells of an individual measuring cycle. Such a procedure has proved to be disadvantageous, particularly for a near-range zone: as already stated, by reason of the properties of the sensor and of the radar measurement, in particular by reason of the range-dependent and therefore frequency-dependent amplification of the received signal, the noise power in the near-range zone (in the first front range-resolution cells) is significantly lower than in the case of relatively long ranges or in the other range cells. If the frequency bins from the other range-resolution cells are also included in the estimation of the noise level for the first range-resolution cells, an elevated detection threshold results correspondingly for the near-range zone. This, in turn, leads to impaired sensitivity of the radar sensor in the near zone in comparison with relatively long ranges. This sensitivity is to be improved, particularly in the first five range-resolution cells. By reason of the reduced sensitivity of the radar sensor in the near zone, a brief loss of function may, in fact, occur in the course of the monitoring of the blind-spot zone. An already activated alarm may, for example, be briefly interrupted, even though a target object continues to be located in the blind-spot zone. This applies, in particular, to large lorries without an underride guard, in which no point of reflection is present, or only weak points of reflection are present, in the central longitudinal region of the lorry.

And conversely, if the frequency bins from the near range cells are used for determining the threshold for the other range cells, the threshold may be set too low, and consequently apparent echoes are detected.

It is an object of the invention to demonstrate a solution as to how, in the case of a method of the type mentioned in the introduction, the sensitivity of the radar sensor, particularly within a predetermined near-range zone, can be improved in comparison with the state of the art.

This object is achieved, according to the invention, by a method, by a radar sensor and also by a motor vehicle having the features according to the respective independent claims. Advantageous embodiments of the invention are the subject-matter of the dependent claims, the description and the figures.

SUMMARY

According to a first aspect of the invention, in order to set the detection threshold for the current subset consisting of at least one frequency bin the noise level is determined from frequency bins of temporally preceding measuring cycles. Instead of ascertaining the noise level for the determination of the detection threshold from frequency bins of other range-resolution cells of the same measuring cycle (as represented in FIG. 1), the noise level is estimated, according to the first aspect, by filtering frequency bins from the preceding measuring cycles, particularly from the same range-resolution cell. Accordingly, filtering over time takes place, with the result that the received power in the range-resolution cell is filtered over several measuring cycles.

According to a second aspect of the invention, the determination of the noise level for the subset currently being examined, consisting of at least one frequency bin, is effected as a function of frequency bins of adjacent Doppler-resolution cells of the frequency spectrum. This aspect proves, particularly in the case of a frequency-modulated continuous-wave radar sensor in which a sequence (burst) of frequency-modulated chirp signals is emitted as a transmitted signal. In the case of such a transmitted signal (multiple-chirp waveform), in each measuring cycle a spectrum in the range/Doppler plane relating to the respective received signal can be determined in a manner known per se, which specifies the signal level of the received signal, in particular the received power, for each range-resolution cell and each Doppler-resolution cell. With such a two-dimensional spectrum it is possible for the target objects to be resolved without much effort, both in terms of range and in terms of Doppler (relative velocity). According to the second aspect, it is now proposed to determine the noise level for the current range-resolution cell not from the frequency bins of other range-resolution cells but from frequency bins of a plurality of Doppler-resolution cells, in particular of the same range-resolution cell or range-resolution column. The term Doppler-resolution cell' is understood in this connection to mean the resolution with which the radar sensor can determine the Doppler shift or the relative velocity of the target objects. If a two-dimensional spectrum of such a type with a Doppler direction and with a range direction is determined, each range-resolution cell includes a plurality of Doppler-resolution cells—in this case the term range-resolution column with several Doppler-resolution cells is used.

Both aspects of the invention are connected by the common idea of not determining the noise level for the determination of the detection threshold for the current subset from at least one frequency bin as a function of frequency bins of other range-resolution cells but rather as a function of frequency bins of other resolution cells (temporally and/or in the Doppler direction) in the same range zone. In this way, the sensitivity of the threshold-value detector, particularly in the near-range zone, is improved. The errors due to range-dependent noise power do not, in fact, any longer have an unfavourable effect on the estimation of noise, because the noise power in a resolution cell that pertains to a relatively long range does not raise the estimation of the noise power in a resolution cell that is associated with a relatively short range. Improving the sensitivity of the radar sensor improves the functionality of the blind-spot monitoring and permits a stable alarm to be output when a target object is present in the blind-spot zone. The optimisation of the estimation of noise, and consequently of the detection threshold, is consequently very advantageous for the detection of points of reflection in the near zone, and therefore for the stable warning.

In each measuring cycle the detection threshold is preferably set individually for each range-resolution cell. The aforementioned subset consequently comprises a single frequency bin or—in the case of a two-dimensional spectrum with a Doppler direction and a range direction—all the frequency bins that are associated with a common range-resolution cell or (in the case of a two-dimensional observation) range-resolution column. By virtue of such a procedure, the optimal detection threshold can be set for each range-resolution cell in each case, with the result that the sensitivity of the radar sensor is also optimal for each range-resolution cell.

In order to set the detection threshold for the respectively current subset, the noise level can be determined as a function of frequency bins of the same range-resolution cell of temporally preceding measuring cycles and/or as a function of frequency bins of adjacent Doppler-resolution cells from the same range-resolution cell (range-resolution column). Consequently, the estimation of the noise level is effected at least on the basis of frequency bins that are associated with the same range-resolution cell as the range-resolution cell being examined at that moment. Where appropriate, frequency bins from the immediately adjacent range-resolution cells can also be used. Frequency bins from range-resolution cells that lie further away from the range-resolution cell currently being examined preferentially remain unconsidered.

The determination, according to the invention, of the noise level can be carried out in one embodiment exclusively for a predetermined near-range zone of the radar sensor, and consequently for a predetermined number of first or near range-resolution cells. It is in fact the near zone is where the sensitivity of the radar sensor is primarily to be improved. Consequently, on the one hand reliable monitoring of the blind-spot zone can be ensured; on the other hand, the computing effort can be reduced if the noise power is estimated in a different way for the other range-resolution cells, and consequently for the far zone. The predetermined near-range zone may, for example, extend as far as a range of 2 m to 5 m from the radar sensor.

According to an alternative embodiment, the determination of the noise level is effected, in accordance with the first and/or the second aspect of the invention, for all the range-resolution cells of the radar sensor. In this way, it is possible to prevent too low a detection threshold from being set in the other range-resolution cells or in the far zone by reason of the determination of the noise level on the basis of frequency bins of the nearer range-resolution cells. Interference signals can consequently be suppressed better in the other range-resolution cells.

In one embodiment there is provision that in order to set the detection threshold for the respectively current subset or for the respectively current range-resolution cell the noise level is determined by filtering, in particular by averaging, the frequency bins of the same range-resolution cell from a predetermined plurality of temporally immediately preceding measuring cycles. By virtue of such filtering of the frequency bins from the preceding measuring cycles, the noise level for the range-resolution cell being examined in the given case can be estimated particularly precisely. This is because the variation of these frequency bins from one another is distinctly slighter than the divergence of the frequency bins from other range-resolution cells.

If in order to determine the frequency bins from the same range-resolution cell are filtered, in particular averaged, over time or, to be more exact, over several measuring cycles, then it has to be ensured that for this determination of the noise level, or for this filtering, merely frequency bins from those preceding measuring cycles are used in which no target echo from a target object was detected in the range-resolution cell being examined at that moment. During the operation of the radar sensor two cases can, in fact, be distinguished: in the range-resolution cell being examined a target is either present or not present. During normal automotive operation these two cases continuously alternate, though one of the cases may also be maintained for a relatively long period of time. The noise power for the range-resolution cell currently being examined can be determined on the basis of frequency bins of the same cell from preceding measuring cycles only when no target echo is present in this cell in the respective measuring cycles. Consequently, it is ensured that for the purpose of determining the noise level no useful signal is used but merely interference signals are used, such as clutter signals and the measuring noise itself.

The checking of whether or not a target echo exists in the at least one range-resolution cell in the respective measuring cycles can be undertaken in a wide variety of ways. On the one hand, this checking can be undertaken metrologically; on the other hand—additionally or alternatively—the existence of a target echo can be inferred as a function of a statistical evaluation of the frequency bins of this cell being examined over several measuring cycles.

In one embodiment there is provision that in order to check whether or not a target echo exists in the at least one range-resolution cell an auxiliary threshold for the frequency bin of this cell is defined as a function of an estimated noise level which is determined as a function of frequency bins of a plurality of range-resolution cells within a measuring cycle. Accordingly, here the conventional threshold is defined, such as is also determined in the state of the art (FIG. 1), as a function of a plurality of frequency bins from differing range-resolution cells. This auxiliary threshold, however, is only utilised in order to be able to make an assumption as to whether or not an echo was present in the range-resolution cell being examined in the respective measuring cycles and, consequently, whether or not these frequency bins can be used for determining the actual detection threshold. Accordingly, here it is checked metrologically whether a target echo is present in the range-resolution cell being examined in the respective measuring cycles. If no target echo is present in the cell being examined in a measuring cycle, the frequency bin from this measuring cycle and from this cell is used for the determination of the current noise level. If the noise power has been estimated with the aid of the conventional CFAR threshold-value detector over a predetermined number of measuring cycles, a switch-over can be made to the new, actual detection threshold.

Additionally or alternatively, the determination of the noise level for the establishment of the actual detection threshold can be effected in accordance with a predetermined statistical method. Frequency bins relating to the range-resolution cell being examined can be stored over a plurality of measuring cycles and can be observed and statistically evaluated over time. According to a predetermined statistical method, it can then be decided on the basis of the stored frequency bins how high the noise level is. In other words, the range-resolution cell is examined over a relatively long time, and an assumption is made in respect of the distribution of the two cases 'without target' and 'with target'. In this embodiment two different methods can be provided: on the one hand, in order to ascertain the noise estimation a rank-order filter may be used over a plurality of frequency bins over time. If the target-presence probability is assumed, for example, to be 50%, a rank in the lower half can be selected as an estimated value of noise power. On the other hand, a histogram of the power values or of the frequency bins per range-resolution cell can also be made available. For each range-resolution cell a plurality of power intervals can be predetermined, and the number of frequency bins that fall within the respective power interval can be counted. Accordingly, for each range-resolution cell the statistical distribution of the power values is produced, the size of this histogram determining the range of values and the accuracy of the noise-power estimation. The size is, however, independent of the number of power values or measuring cycles examined. A histogram of such a type can then be statistically evaluated in various ways. For example, a median of all the values can be ascertained which then provides an estimation similar to that of the rank-order filter.

As already stated, a two-dimensional spectrum that specifies the signal value or the frequency bin for each pair consisting of a range-resolution cell and a Doppler-resolution cell can be determined for the respective received signal. In order to set the detection threshold for the respectively current subset or for the at least one frequency bin, the noise level can be determined as a function of frequency bins from a plurality of Doppler-resolution cells at least in the range-resolution column being examined. This embodiment is based on the insight that the noise power is the same over all the Doppler-resolution cells within a range-resolution column (in the two-dimensional spectrum), and changes merely over the range. The frequency bins from all the Doppler-resolution cells of a particular frequency-resolution column can consequently be used for determining the noise level in this range-resolution column. This noise level can then even be used for the determination of the detection threshold for all the frequency bins from this range-resolution column. This means that a common detection threshold can be utilised for all the frequency bins of the range-resolution column and consequently for all the Doppler-resolution cells of this column.

Additionally or alternatively, the noise level for a particular range-resolution cell can also be determined as a function of frequency bins from a plurality of Doppler-resolution cells of at least one immediately adjacent range-resolution column. Consequently, the number of frequency bins used for determining the noise level, and consequently also the accuracy of the determination of the noise level, can be increased.

The determination of the noise level for setting the detection threshold for a particular range-resolution cell can comprise the frequency bins of temporally preceding measuring cycles and/or the frequency bins of at least the adjacent Doppler-resolution cells being supplied to a rank-order filter, by means of which, in accordance with a predetermined selection criterion, one of the frequency bins is selected as the noise level. The noise power can consequently be reliably estimated individually for each range-resolution cell. Additionally or alternatively, use may be made—as already stated—of a histogram, by means of which the noise level is estimated.

The invention relates, in addition, to a frequency-modulated continuous-wave radar sensor for a motor vehicle, which has been designed for the purpose of implementing a method according to the invention. A motor vehicle according to the invention comprises a radar sensor according to the invention. The preferred embodiments presented with reference to the method according to the invention, and the advantages thereof, apply correspondingly to the radar sensor according to the invention and also to the motor vehicle according to the invention.

Further features of the invention arise from the claims, the figures and the description of the figures. All the features and combinations of features mentioned above in the description, and also the features and combinations of features mentioned in the following in the description of the figures, and/or shown in the figures alone, can be used not only in the respectively specified combination but also in other combinations or on their own.

BRIEF DESCRIPTION OF THE DRAWINGS

The invention will now be explained in greater detail on the basis of individual preferred exemplary embodiments and also with reference to the appended drawings. Shown are.

DETAILED DESCRIPTION

Figure 2:
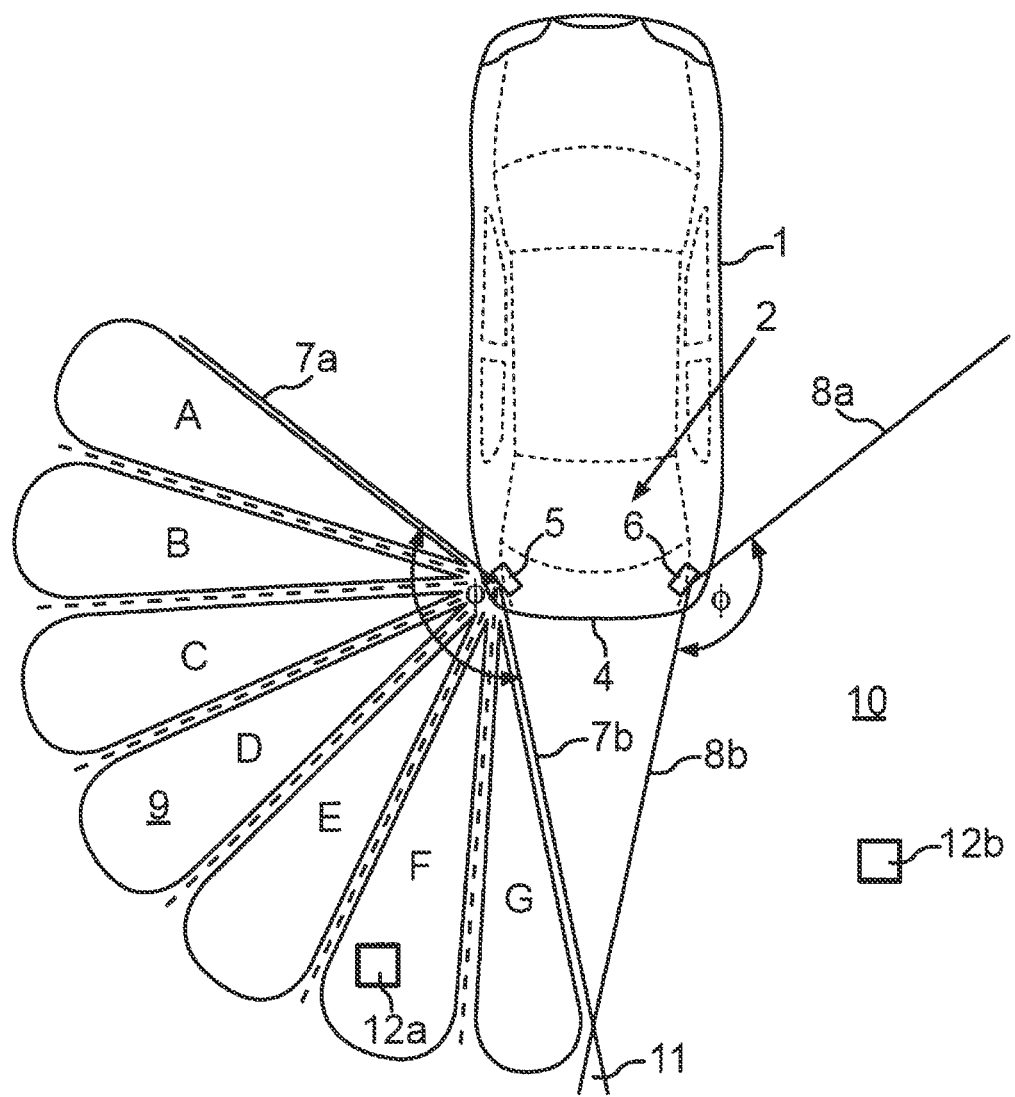
FIG. 2 in a schematic representation, a motor vehicle with radar sensors according to an embodiment of the invention.

A motor vehicle 1 represented in FIG. 2 is, for example, a passenger car. The motor vehicle 1 comprises a driver-assistance device 2 which assists the driver in connection with the driving of the motor vehicle 1. Said device may be, for example, a blind-spot detection system (blind-spot warning) and/or a lane-change assistant (lane-change assist) and/or an aid for reversing out of a parking space (cross-traffic alert) and/or a door-opener assistant (door-opening assist) and/or a collision-detection system (rear pre-crash).

The driver-assistance device 2 includes two radar sensors 5, 6 which are arranged behind a rear bumper 4 of the motor vehicle 1. The first radar sensor 5 is arranged in a left rear corner region of the motor vehicle 1, whereas the second radar sensor 6 is arranged in a right rear corner region. Both radar sensors 5, 6 are located behind the bumper 4 and are consequently not visible from outside the motor vehicle 1.

The radar sensors 5, 6 in the exemplary embodiment are frequency-modulated continuous-wave radar sensors (FMCW). The radar sensors 5, 6 each possess an azimuthal capture zone φ, which is bounded in FIG. 2 by two lines 7a, 7b (for the left radar sensor 5) and 8a, 8b (for the right radar sensor 6). The azimuthal capture angle φ is 150°, for example. By this angle φ a field of view 9 and 10, respectively, of the respective radar sensor 5, 6 is defined in the azimuth direction and consequently in the horizontal direction. The fields of view 9, 10 may also overlap one another, with the result that there is an overlapping zone 11.

Each radar sensor 5, 6 includes an integrated computing device, for example in the form of a digital signal processor, which drives the radar sensor 5, 6 and, in addition, processes and evaluates the received signals. But, alternatively, a common and external computing device for the two sensors 5, 6 may also be provided, computing device which can then process the received signals of the two sensors 5, 6.

In their respective fields of view 9, 10 the radar sensors 5, 6 can detect target objects 12a (to the left) and 12b (to the right) external to the vehicle. In particular, the radar sensors 5, 6 can determine the range of the target objects 12a and 12b from the respective radar sensor 5, 6 and can also determine respectively the target angle and the relative velocity of the target objects 12a and 12b with respect to the motor vehicle 1—these are measured variables of the radar sensors 5, 6.

Referring further to FIG. 2, radar sensor 5—and, analogously, also sensor 6—can irradiate various subzones A, B, C, D, E, F, G of the azimuthal field of view 9 in succession. These subzones A to G constitute angular ranges, wherein in order to capture subzones A to G in succession a transmitting lobe of the transmitting antenna of radar sensor 5, for example, is swivelled electronically in the azimuth direction, namely in accordance with the phase-array principle. The differing orientations of the transmitting lobe are indicated schematically in FIG. 2 for the differing subzones A to G.

The receiving antennas of radar sensor 5 may exhibit in the azimuthal direction overall a broad receiving characteristic with which the entire azimuthal field of view 9 is covered. Other configurations may alternatively realise narrow receiving-angle ranges in conjunction with broad transmitting lobes.

In FIG. 2, for the sake of an overview, merely subzones A to G of the field of view 9 of the first radar sensor 5 are represented. Correspondingly, however, the horizontal field of view 10 of the second radar sensor 6 is also subdivided here into several subzones. Even though the further description relates to the mode of operation of the first sensor 5, the mode of operation of the second sensor 6 corresponds to that of the first sensor 5.

The number of subzones A to G is represented in FIG. 2 merely in an exemplary manner and may be different, depending on the embodiment. In the exemplary embodiment, a total of seven subzones A to G have been provided, which are illuminated one after the other by radar sensor 5.

The mode of operation of radar sensor 5 is as follows: in an individual measuring cycle of radar sensor 5 the main lobe of the transmitting antenna is firstly swivelled in stepwise manner from subzone A as far as subzone G, with the result that subzones A to G are illuminated one after the other. For each subzone A to G a temporal sequence of frequency-modulated chirp signals (chirps) is emitted in each case here. First of all, such a sequence of chirp signals is emitted for subzone A. After a predetermined transmission pause, a sequence of chirp signals is then emitted into subzone B. After a further predetermined transmission pause, subzone C is then irradiated, etc. As is evident from FIG. 2, radar sensor 5 exhibits a greater range of transmission for subzone G than for the remaining subzones A to F. This is achieved by virtue of the fact that for subzone G the emitted sequence exhibits more chirp signals than for the remaining zones A to F. Whereas for subzones A to F 16 chirp signals, for example, are emitted within the respective sequence, for subzone G a total of 64 chirp signals, for example, are emitted within the sequence.

The detection of the target objects 12a, 12b is accordingly effected individually and separately for each subzone A to G. Consequently, it is possible to track the target objects 12a, 12b in the entire field of view 9, 10.

Radar sensor 5 accordingly emits in each measuring cycle in each case one transmitted signal per 'beam' or per subzone A to G, each transmitted signal comprising a sequence of chirp signals. For the sake of simplicity, reference will be made in the following merely to an individual subzone A to G and consequently to an individual transmitted signal per measuring cycle. The evaluation of the respective received signals may, however, be effected analogously for all subzones A to G.

Figure 3:
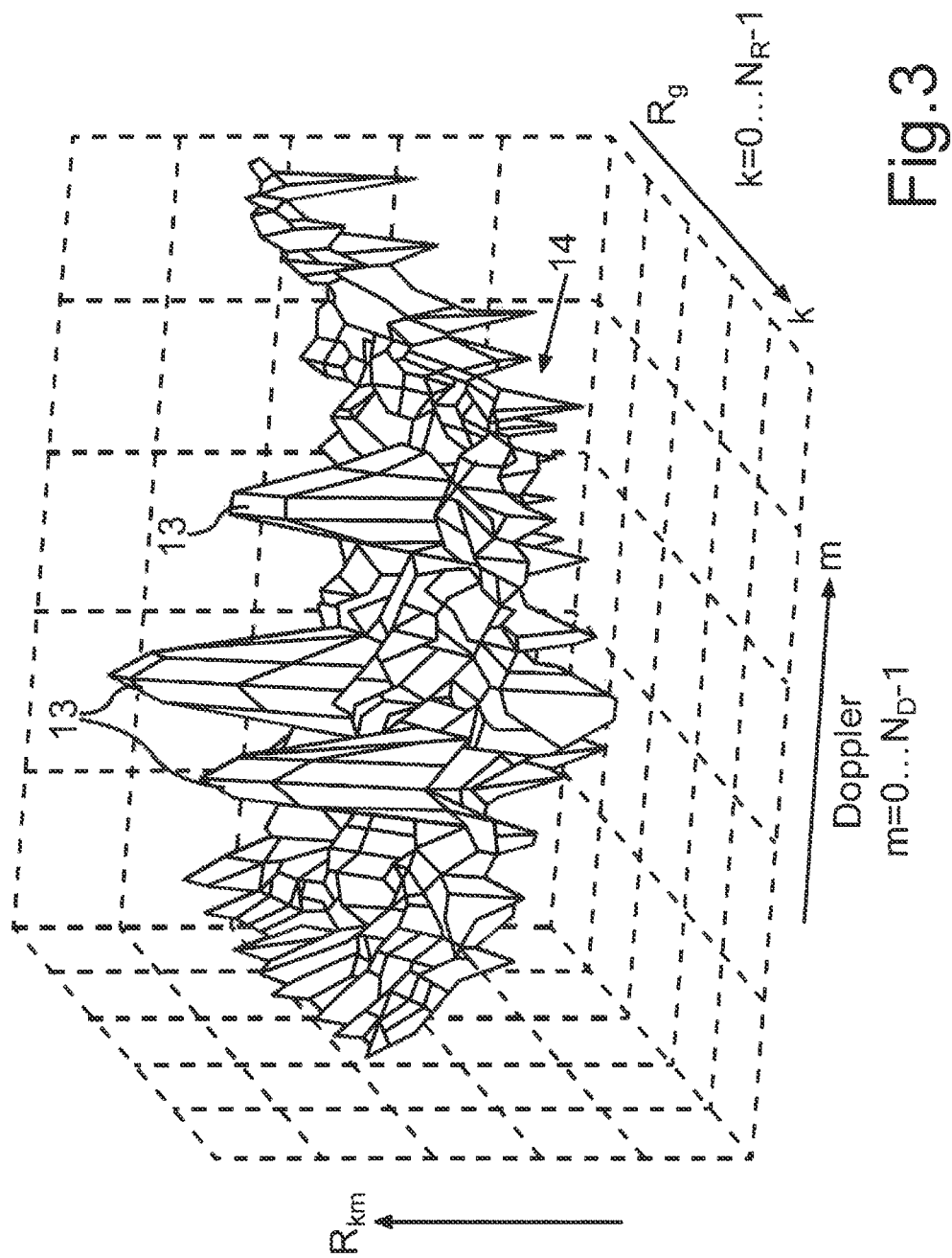
FIG. 3 in a schematic representation, a two-dimensional spectrum of a received signal.

Because the transmitted signal comprises a plurality of successive chirp signals, a two-dimensional spectrum relating to the received signal can be determined (by FFT), as is represented schematically in an exemplary manner in FIG. 3. This spectrum specifies frequency bins $R_{km}$ or power values of the received signal for each combination of range-resolution cells k and Doppler-resolution cells m. In the case of the power spectrum according to FIG. 3 the range Rg has been plotted on the k-axis, whereas on the m-axis the Doppler shift and consequently the relative velocity has been plotted. With such a spectrum the target objects 12 can be resolved, on the one hand by range from radar sensor 5, and on the other hand also by relative velocity. The spectrum according to FIG. 3 comprises, in an exemplary manner, three target echoes 13 which rise distinctly above the so-called noise carpet 14.

Figure 4:
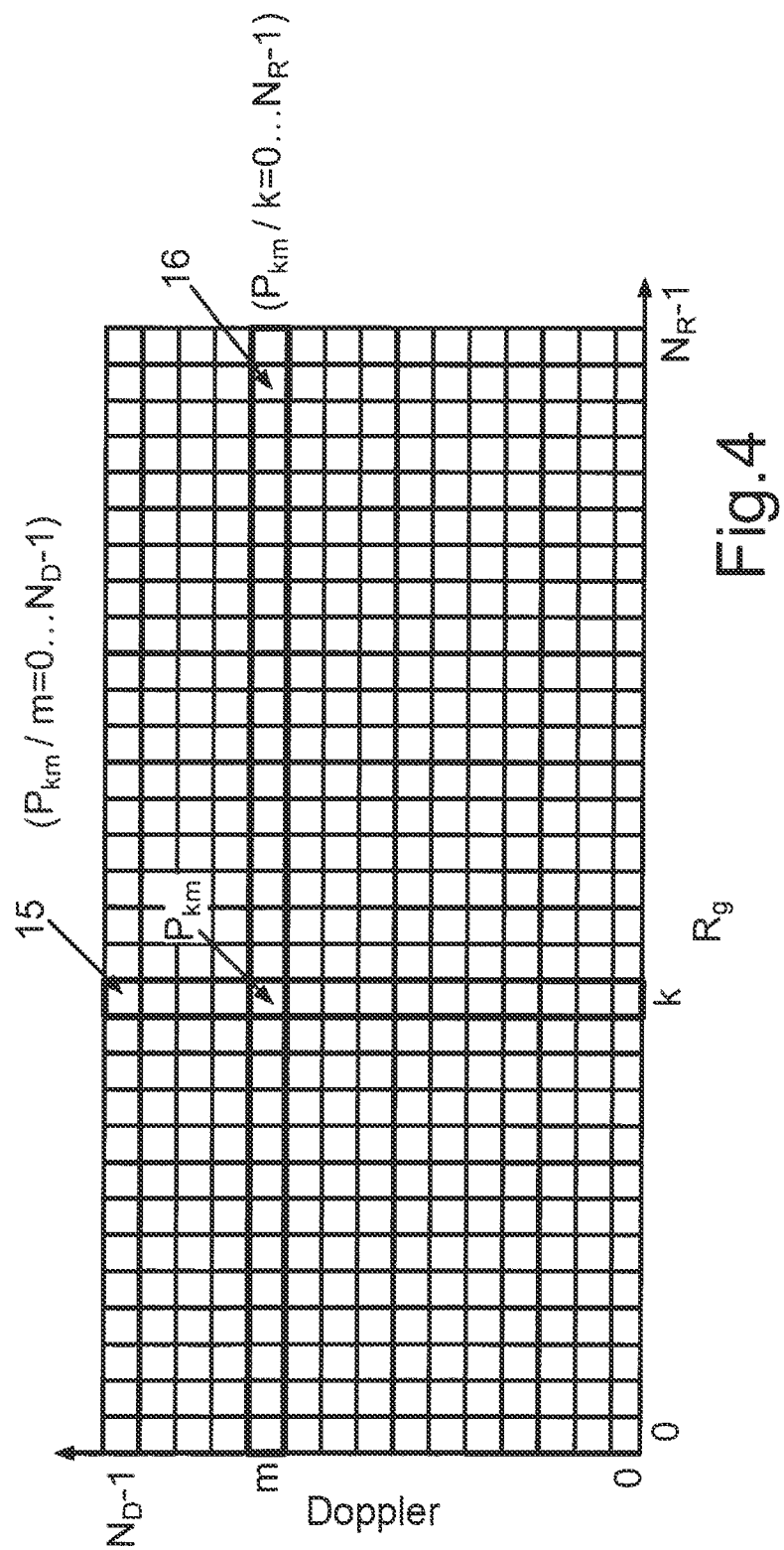
FIG. 4 in a schematic representation, another observation of the two-dimensional spectrum.

Another observation of the spectrum is represented in FIG. 4. Here the respective resolution cells m, k are represented in greater detail. On the one axis the Doppler shift, 'Doppler', is plotted; on the other axis the range Rg is plotted. There are a total of $N_R$ range-resolution cells of the radar sensor 5, where $N_R$ corresponds to half the number of sampled values of the received signal per chirp signal plus one: $N_R = N_{Sample}/2+1$. $N_R$ can be 129, for example. In contrast, the number of Doppler-resolution cells $N_D$ corresponds to the number of emitted chirp signals within a transmitted signal or per 'burst' (for example, 16 or 64 chirp signals). This number $N_D$ may also be different for differing subzones A to G (FIG. 2), in order to obtain differing ranges of transmission.

With further reference to FIG. 4, a particular range-resolution column 15 comprises a total of $N_D$ Doppler-resolution cells, whereas a particular Doppler-resolution column 16 comprises a total of $N_R$ range-resolution cells. A cell $P_{km}$ that is common to range-resolution column 15 and Doppler-resolution column 16 exhibits a power value of the received signal or a frequency bin $R_{km}$. For each such cell $P_{km}$ a frequency bin $R_{km}$ is consequently determined in each case which specifies the power value of the received signal in this cell $P_{km}$.

Figure 5:
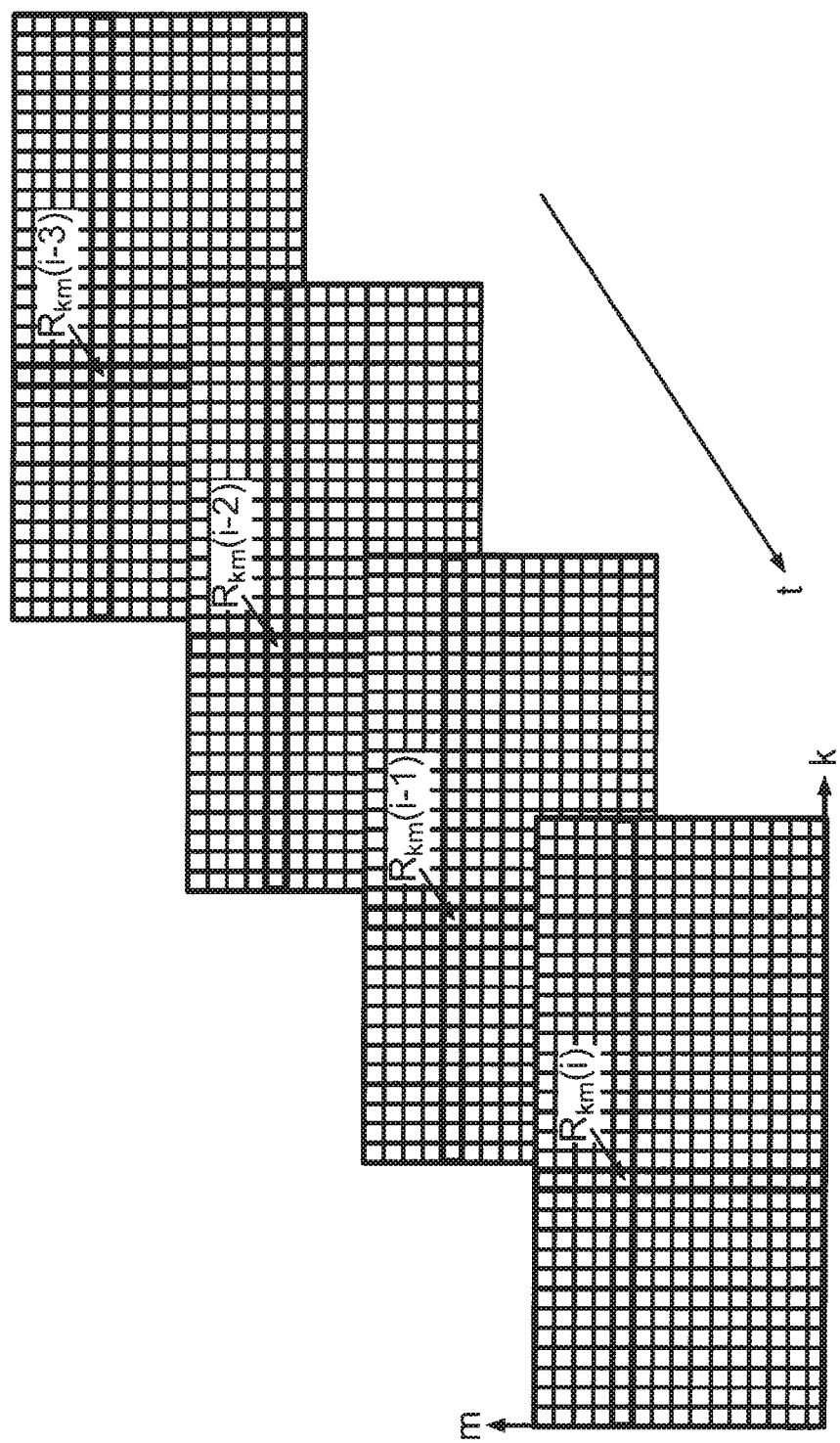
FIG. 5 a schematic representation explaining a method according to an embodiment of the invention.

If a spectrum of such a type relating to the respective received signal is determined in all the successive measuring cycles, a temporal dimension is also added, as has been represented schematically in FIG. 5. In this connection, t denotes the time. In cell $P_{km}$ there are now differing frequency bins $R_{km}(i-3)$ to $R_{km}(i)$ in the differing measuring cycles. In this connection, i denotes the current measuring cycle, whereas (i-1), (i-2) and (i-3) are the three last or preceding measuring cycles.

In the respectively current measuring cycle the noise power or noise level is estimated for each individual range-resolution column 15 in each case for all the Doppler-resolution cells $m=0 \ldots N_{D-1}$, as a function of which the detection threshold for all the frequency bins of this range-resolution column 15 is then determined individually. During the operation of radar sensor 5 this detection threshold is adaptively set individually for each range-resolution column 15. Alternatively, the detection threshold can also be set individually for each individual cell $P_{km}$.

In order to estimate the noise level for a particular cell $P_{km}$, frequency bins from the same cell $P_{km}$ but from the preceding measuring cycles, and/or frequency bins from the other Doppler-resolution cells m of the same range-resolution column 15, can be utilised. These two methods are preferably combined with one another.

In the following, various examples for estimating the noise level will be presented:

First Example

According to the first example, the noise power for a particular cell $P_{km}$ is estimated merely on the basis of frequency bins from the same measuring cycle i. In order to estimate the noise level, in this case all the frequency bins from the range-resolution column 15 being examined and from the immediately adjacent range-resolution columns are utilised.

Figure 1:
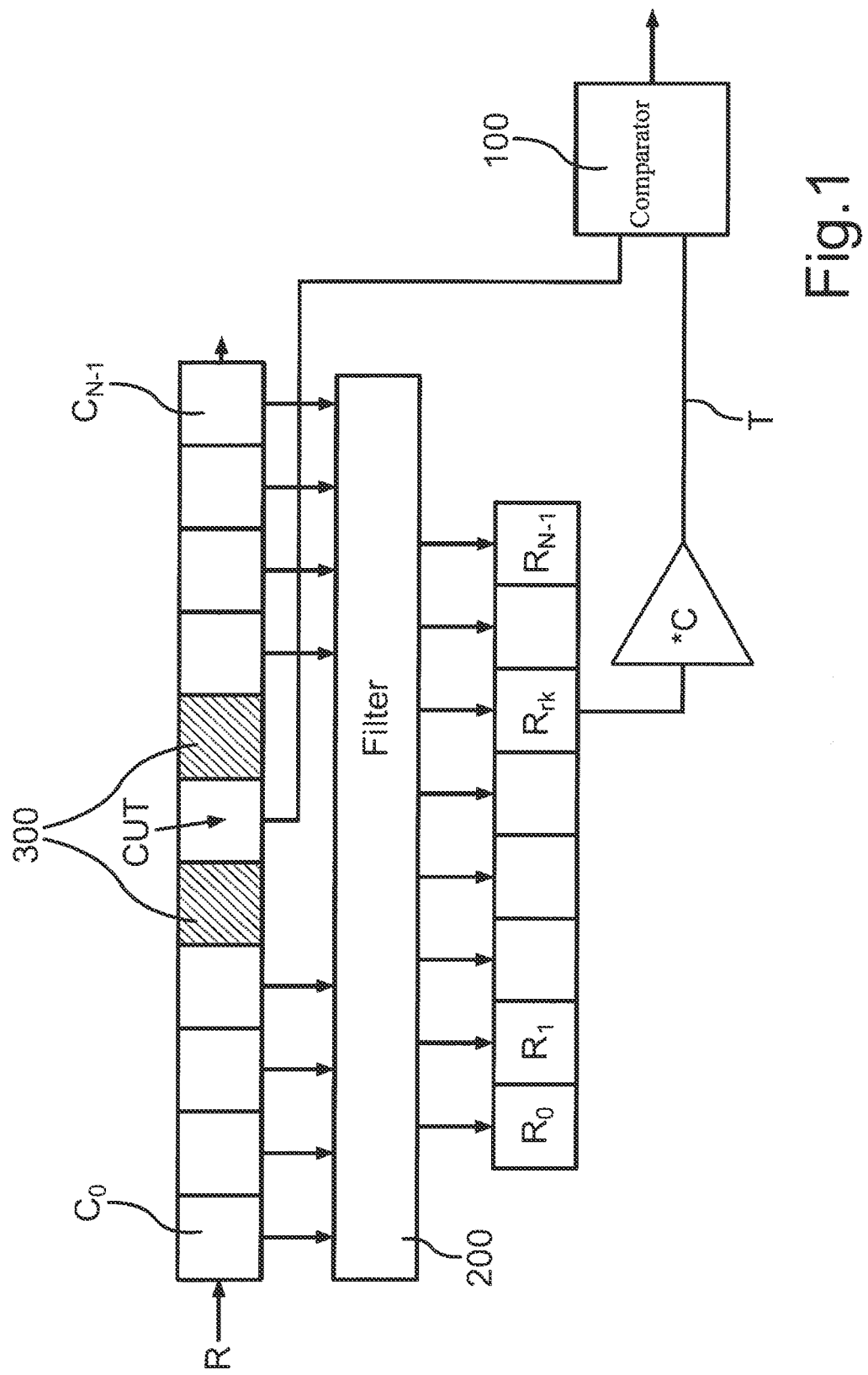
FIG. 1 in a schematic representation, a rank-order filter for establishing a detection threshold in accordance with the state of the art.

Let the resolution cells of the spectrum be $P_{km}$, where $k= 0 \ldots N_D-1$ and $m=0 \ldots N_R-1$. In a predetermined near-range zone and consequently, for example, for the first $N_{near}=6$ range-resolution columns from k=0 to k=5 in each case the detection threshold and, in addition, the respective noise level are to be determined. For range-resolution cells $k>0$ and $k<N_{near}=6$ the assigned frequency bins $R_{k'm'}$ with $k'=k-1 \ldots k+1$ and $m'=0 \ldots N_D-1$ are supplied to a rank-order filtering stage (as in FIG. 1), and rank $R_{rk}$ is selected as noise level.

For the first range-resolution column k=0 no left hand adjacent column exists in this case, and the frequency bins $R_{k'm'}$ where $k'=0 \ldots 2$ and $m'=0 \ldots N_D-1$ are supplied to a rank-order filtering stage. Here too, rank $R_{rk}$ is selected as the noise level. The detection threshold determined for the respective range-resolution column 15 may apply to all the Doppler-resolution cells of this column. The detection threshold results, for example, by multiplication of the noise level by a predetermined factor.

In the first example, for a particular range-resolution column 15 a total of $3 \times N_D=48$ values or frequency bins are processed in the rank-order filter. For the rank, rk=24—that is to say, the median—can be selected.

Second Example

In the second example, additionally the frequency bins from the preceding measuring cycles are also taken into account in the determination of the noise level. Let the frequency bins of the spectrum be $R_{k,m}(i)$, where $k=0 \ldots N_D-1$ and $m=0 \ldots N_R-1$, and where i denotes the current measuring cycle. In the near-range zone, the respective detection threshold is now to be determined and, in addition, the respective noise level is to be estimated for the first $N_{near}=6$ range-resolution columns 15.

For measuring cycle i and for range-resolution column k the frequency bins $P_{k'm'}(i')$ with $k'=k$ and $m'=0 \ldots N_D-1$ and also $i'=i-9 \ldots i$ and consequently all the frequency bins from the range-resolution column k being examined from the instantaneous measuring cycle and from the nine preceding measuring cycles are supplied to a rank-order filtering stage. Once again, rank $R_{rk}$ is selected as the estimated value of the noise power for range-resolution column k of measuring cycle i.

In the second example a total of $10 \times N_D=160$ values are processed in the rank-order filter for each range-resolution column 15. For the rank, the median—that is to say, the 80th value (rk=80)—is selected, for example.

Third Embodiment

This third embodiment corresponds in principle to the second example, wherein instead of a rank-order filter a histogram is applied. For measuring cycle i and range-resolution column k the frequency bins $R_{k'm'}(i)$ where $k'=k$ and $m'=0 \ldots N_D-1$ are used. These frequency bins $R_{k'm'}(i)$ are converted into a logarithmic scale (in dB) and inserted into a histogram H. In this histogram H a predetermined number $N_H$ of power intervals is predetermined, namely for example $N_H=256$ power intervals. Each power interval may have the size of 1 dB. For each power interval a counter value $H_0$ to $H_N$ is implemented in each case, and a check is made as to the power intervals within which the respective frequency bins $R_{k'm'}(i)$ fall. The assigned counter value $H_0 \ldots H_N$ is then incremented in each case when a frequency bin falls within the assigned power interval. There may, for example, be provision that counter value $H_0$ counts the power values in the interval from 0 dB to 1 dB, $H_1$ in the interval from 1 dB to 2 dB, etc. This results overall in a total range of values of the histogram of 256 dB, which fully suffices for a radar measurement. The accuracy of the noise-power measurement is restricted by the step width to the order of magnitude of 1 dB, which is likewise sufficient for a radar measurement.

The median of the histogram is then used to ascertain the estimated value of noise power for the current range-resolution column k:

The cumulative sum $S_p$ of the first p counter values results from:

$$S_p = \sum_{p'=0}^{p} H_{p'}$$

The total area of the histogram is, in contrast:

$$S_{255} = \sum_{p'=0}^{255} H_{p'}$$

The algorithm is started with p=0. $S_0=H_0$ is calculated. As long as $S_p<S_{255}/2$, p is incremented by one in each case and $S_p=S_{p-1}+H_p$ is calculated. The algorithm is terminated when $S_p \geq S_{255}/2$. The p-th power interval is used as the noise level.

In order not to let the histogram grow arbitrarily, and therefore to take account of the already obsolete values to a slight extent, all the values of the histogram can be halved when one of the counter values, namely the largest counter value, exceeds a predetermined number, for example 1000.

In other words, in the third example that power interval whose counter value is equal to or a little larger than the sum of all the counter values of the histogram is selected as the noise level.

The invention claimed is:

1. A method for setting a detection threshold for a received signal of a frequency-modulated continuous-wave radar sensor of a motor vehicle, in which:
   in successive measuring cycles of the radar sensor in each case a radar signal is emitted into a capture zone of the radar sensor and a radar signal reflected in the capture zone is received as a received signal by the radar sensor,
   in each measuring cycle a frequency spectrum relating to the respective received signal is determined, wherein individual frequency bins of the frequency spectrum each correspond to a signal level in a range-resolution cell of the radar sensor, and
   in each measuring cycle the detection threshold is set individually in each case for a subset composed of at least one frequency bin, and in order to set the detection threshold for the respectively current subset a noise level of the frequency spectrum is determined and the detection threshold is set as a function of the noise level,
   wherein in order to set the detection threshold for the current subset the noise level is determined from frequency bins of temporally preceding measuring cycles and/or from frequency bins of adjacent Doppler-resolution cells of the frequency spectrum.

2. The method according to claim 1, wherein in each measuring cycle the detection threshold is set individually for each range-resolution cell.

3. The method according to claim 1, wherein in order to set the detection threshold for the respectively current subset the noise level is determined from frequency bins of the same range-resolution cell of temporally preceding measuring cycles and/or from frequency bins of adjacent Doppler-resolution cells from the same range-resolution cell.

4. The method according to claim 1, wherein the determination of the noise level from the frequency bins of temporally preceding measuring cycles and/or from the frequency bins of adjacent Doppler-resolution cells is effected exclusively for a predetermined near-range zone ($N_{near}$) of the radar sensor.

5. The method according to claim 1, wherein the determination of the noise level from the frequency bins of temporally preceding measuring cycles and/or from the frequency bins of adjacent Doppler-resolution cells is effected for all the range-resolution cells.

6. The method according to claim 1, wherein in order to set the detection threshold for the respectively current subset the noise level is determined by filtering, in particular by averaging, the frequency bins of the same range-resolution cell from a predetermined plurality of temporally immediately preceding measuring cycles.

7. The method according to claim 1, wherein in order to determine the noise level for the current subset exclusively frequency bins from those preceding measuring cycles are used in which no target echo from a target object has been detected in the at least one range-resolution cell of the current subset.

8. The method according to claim 7, wherein in order to check whether a target echo exists in the at least one range-resolution cell an auxiliary threshold for the frequency bin of this range-resolution cell is defined as a function of an estimated noise level which is determined as a function of frequency bins of a plurality of range-resolution cells within a measuring cycle.

9. The method according to claim 1, wherein in order to set the detection threshold for the at least one frequency bin the noise level is determined as a function of frequency bins from a plurality of Doppler-resolution cells of at least the same range-resolution cell.

10. The method according to claim 1, wherein in order to set the detection threshold for the at least one frequency bin the noise level is determined as a function of frequency bins from a plurality of Doppler-resolution cells of at least one immediately adjacent range-resolution cell.

11. The method according to claim 1, wherein the determination of the noise level for setting the detection threshold for the respectively current subset comprises the frequency bins of temporally preceding measuring cycles and/or the frequency bins of adjacent Doppler-resolution cells of the frequency spectrum being supplied to a rank-order filter, by means of which one of the frequency bins is selected as noise level in accordance with a predetermined selection criterion.

12. A frequency-modulated continuous-wave radar sensor for a motor vehicle, wherein the radar sensor is configured to execute an operation that sets a detection threshold for a received signal, the operation comprising:
   in successive measuring cycles of the radar sensor in each case a radar signal is emitted into a capture zone of the radar sensor and a radar signal reflected in the capture zone is received as a received signal by the radar sensor,
   in each measuring cycle a frequency spectrum relating to the respective received signal is determined, wherein individual frequency bins of the frequency spectrum each correspond to a signal level in a range-resolution cell of the radar sensor, and in each measuring cycle a detection threshold is set individually in each case for a subset composed of at least one frequency bin, and in order to set the detection threshold for the respectively current subset a noise level of the frequency spectrum is determined and the detection threshold is set as a function of the noise level, wherein in order to set the detection threshold for the current subset the noise level is determined from frequency bins of temporally preceding measuring cycles and/or from frequency bins of adjacent Doppler-resolution cells of the frequency spectrum.

13. A motor vehicle comprising:

a frequency-modulated continuous-wave radar sensor that:

in successive measuring cycles of the radar sensor in each case a radar signal is emitted into a capture zone of the radar sensor and a radar signal reflected in the capture zone is received as a received signal by the radar sensor, in each measuring cycle a frequency spectrum relating to the respective received signal is determined, wherein individual frequency bins of the frequency spectrum each correspond to a signal level in a range-resolution cell of the radar sensor, and in each measuring cycle a detection threshold is set individually in each case for a subset composed of at least one frequency bin, and in order to set the detection threshold for the respectively current subset a noise level of the frequency spectrum is determined and the detection threshold is set as a function of the noise level, wherein in order to set the detection threshold for the current subset the noise level is determined from frequency bins of temporally preceding measuring cycles and/or from frequency bins of adjacent Doppler-resolution cells of the frequency spectrum.

\* \* \* \* \*